(12) United States Patent
Figliozzi

(10) Patent No.: US 9,273,214 B1
(45) Date of Patent: Mar. 1, 2016

(54) REMOVABLE SPRAY COATING AND APPLICATION METHOD

(71) Applicant: Mark Figliozzi, Rockville, MD (US)

(72) Inventor: Mark Figliozzi, Rockville, MD (US)

( * ) Notice: Subject to any disclaimer, the term of this patent is extended or adjusted under 35 U.S.C. 154(b) by 0 days.

(21) Appl. No.: 14/196,396

(22) Filed: Mar. 4, 2014

Related U.S. Application Data

(60) Provisional application No. 61/772,039, filed on Mar. 4, 2013.

(51) Int. Cl.
 *C09D 7/00* (2006.01)

(52) U.S. Cl.
 CPC ........................................ *C09D 7/001* (2013.01)

(58) Field of Classification Search
 CPC .......................................................... C09D 7/00
 USPC .......................................................... 524/356
 See application file for complete search history.

(56) References Cited

U.S. PATENT DOCUMENTS

| | | | |
|---|---|---|---|
| 5,285,967 A | 2/1994 | Weidman | |
| 6,488,773 B1 | 12/2002 | Ehrhardt et al. | |
| 8,263,231 B2 | 9/2012 | Mesa | |
| 2003/0149164 A1 | 8/2003 | Minnee et al. | |
| 2004/0247837 A1* | 12/2004 | Enlow | B32B 27/00 428/195.1 |
| 2006/0078672 A1* | 4/2006 | Merz et al. | 427/96.2 |
| 2009/0162679 A1 | 6/2009 | Asami et al. | |
| 2010/0041772 A1 | 2/2010 | Liversage et al. | |
| 2010/0261120 A1* | 10/2010 | Waldis | G02B 5/0808 430/322 |
| 2012/0085838 A1 | 4/2012 | Larson | |
| 2012/0097767 A1 | 4/2012 | Larson | |
| 2012/0219796 A1* | 8/2012 | Igarashi | C09J 7/021 428/355 EN |
| 2013/0136865 A1* | 5/2013 | Groenewolt | C08G 18/10 427/387 |
| 2013/0302628 A1 | 11/2013 | Shedlosky et al. | |
| 2013/0324654 A1 | 12/2013 | Banoun | |

FOREIGN PATENT DOCUMENTS

| | | |
|---|---|---|
| DE | 4110098 A1 | 4/1992 |
| EP | 0894815 B1 | 12/2002 |
| EP | 1417273 B1 | 9/2010 |
| JP | 2007330834 A * | 12/2007 |

OTHER PUBLICATIONS

The Alsa Corporation, The Worlds Most Exotic Finishes Custom Paint and Candy Paint, http://www.alsacorp.com/, retrieved on Mar. 4, 2014, pp. 1-7.

* cited by examiner

*Primary Examiner* — Michael M Bernshteyn

(74) *Attorney, Agent, or Firm* — Edell, Shapiro & Finnan, LLC

(57) ABSTRACT

According to the present invention, sprayable liquid solvent-based compositions for removable coatings are provided along with methods of applying those compositions to a surface for protecting and improving the appearance of the surface. Solvent-based compositions may be applied to a surface as a liquid and undergo evaporation and/or drying to form a "rubberized" material, forming a substantially uniform protective coating on a surface.

22 Claims, 1 Drawing Sheet

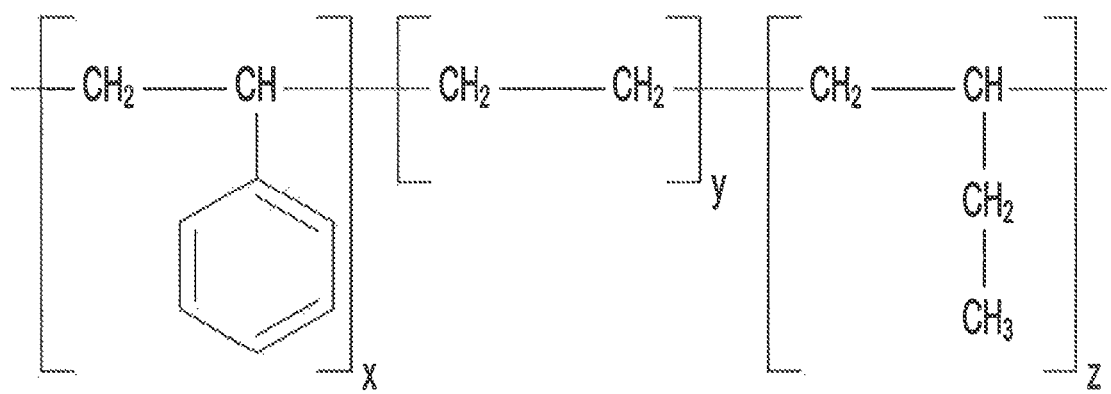

REMOVABLE SPRAY COATING AND APPLICATION METHOD

CROSS-REFERENCE TO RELATED APPLICATION

This application claims the benefit of U.S. Provisional Patent Application No. 61/772,039, filed on Mar. 4, 2013, which is herein incorporated by reference in its entirety.

TECHNICAL FIELD

The present invention pertains to solvent-based industrial and commercial liquid compositions, including compositions comprising low volatility organic compounds, for forming removable elastic coatings to protect surfaces against physical and environmental damage, and to methods for making and applying those coatings.

BACKGROUND

Conventional products used in the automotive industry for protection against physical or environmental damage typically utilize solid-state vinyl or plastic wrap films. Solid-state products may be challenging to apply and may not provide adequate protection.

Solid vinyl wrap films and solid sheet protective coatings have been used for over a decade. Application of solid vinyl wraps, which is traditionally done by hand, requires a steady hand, years of training, and tremendous patience to install, especially on objects with many curvatures. Solid vinyl wrap films also have associated high manufacturing costs, as vinyl wrap films require complex machinery to lay, roll and spool the films, thereby increasing the production cost of the base film material. Additionally, many vinyl wrap films may leave an adhesive glue or residue behind upon removal of the film.

Other products for protection against physical or environmental damage involve sprayable aqueous-based compositions. However, aqueous compositions have considerably longer drying velocities, exhibit variations in quality due to changes in humidity and temperature during the application and drying process, and may be difficult to remove. Further, aqueous-based compositions may freeze during commercial shipping and storage, potentially leading to further variability in the final solid coating product, and are susceptible to UV damage. Aqueous-based compositions are extremely sensitive to temperature. For example, some aqueous-based compositions cannot dry properly below 70° Fahrenheit (F.), and therefore, such compositions cannot be applied unless the temperature is 70° F. or above. Additionally, some aqueous-based compositions are not removable if the temperature falls below 70° F. Further, some aqueous-based compositions degrade over a period of time, e.g., 3 months, 6 months, a year, etc., such that the coating formed by the aqueous-based composition becomes more adhesive and difficult or even nearly impossible to remove over time.

SUMMARY OF THE INVENTION

According to the present invention, sprayable liquid solvent-based compositions for removable coatings are provided along with methods of applying those compositions to a surface for protecting and improving the appearance of the surface. Solvent-based compositions may be applied to a surface as a liquid and undergo evaporation and/or drying to form a "rubberized" material, forming a substantially uniform protective coating on a surface. The protective coating may help protect the surface from various types of physical and/or environmental damage, e.g., UV damage, abrasion, corrosion, debris, etc. Additionally, such coatings provide a barrier against moisture, preventing primers, body fillers, polyesters, etc., from absorbing moisture until a permanent coat of paint may be applied.

Additional embodiments of the techniques presented herein encompass changing the appearance, e.g., color, tint, and/or shine, of surfaces, including automobiles, automobile parts, and automobile accessories using the solvent-based compositions disclosed herein, which may comprise a fluorescence tinting or coloring agent.

In still further embodiments, the compositions disclosed herein may be used in conjunction with one or more other layers, including, e.g., a top coat layer, or fluorescent, candy or pearl coat paint layers, etc., to provide an improved appearance.

The present invention also encompasses methods of applying solvent-based compositions to a surface. Surfaces may include any suitable surface of an article of manufacture, including, e.g., automobiles, automobile parts, automobile accessories, etc., and may be applied over finishes, e.g., cured automotive urethane and polyurethane finishes, etc., to cover the primary exterior surface of a vehicle. It is noted that the present invention is not limited to applications in the automotive industry, but may apply to any suitable surface exposed to wear and tear from physical or environmental factors.

Accordingly, the techniques disclosed herein provide significant advantages over products which are applied in solid-to-solid form and aqueous based formulations, namely, reduced installation times, less expensive costs from manufacturing, improved performance, and ease of removal. Additionally, solvent-based compositions offer superior protection, as compared to products applied as solids, providing a superior seal between the protective coating itself and the surface to which it is applied.

The above and still further features and advantages of the present invention will become apparent upon consideration of the following definitions and descriptions of specific embodiments thereof. While these descriptions go into specific details of the invention, it should be understood that variations may and do exist and would be apparent to those skilled in the art based on the descriptions herein.

BRIEF DESCRIPTION OF THE FIGURE

The sole FIGURE shows an example of a preferred block copolymer according to the methods and compositions disclosed herein.

DETAILED DESCRIPTION OF THE PREFERRED EMBODIMENTS

The present invention comprises sprayable liquid solvent-based compositions comprised of a rubberized resin base along with various solvents, which are applied to a surface in the form of a liquid, and which dry/evaporate to form a solid rubberized coating that preserves and/or changes the appearance of the surface that it covers. Solvent-based compositions are typically applied using a high volume low pressure (HVLP) spray device, which provides ease of application.

Sprayable solvent-based compositions, as disclosed herein, generally have the properties of: (1) drying/evaporating to form a solid in a relatively short period of time, (2) providing UV-protection, (3) being self-leveling and forming a smooth surface without surface defects during the evaporation/drying process, (4) having excellent elasticity and being easy to remove, (5) providing adequate protection for a surface from physical and/or environmental damage, (6) being tintable (color) or clear, and (7) being self-adhering. Proper application with an appropriate spray device results in a smooth surface and fine finish.

Additionally, the sprayable solvent-based compositions, as disclosed herein, may be applied under a variety of environmental conditions, including relatively low (near 32° F.) or relatively high temperatures (near 70° F.), as well as temperatures in between. Additionally, the solvent-based compositions may be applied under variable humidity, forming a high performance base coat having desired characteristics, as disclosed herein. It is understood that the specified temperature ranges are exemplary; the solvent-base compositions may be applied at lower or higher temperatures as well.

The term "leveling" refers to a property of a coating to even out imperfections arising during application of the coating. The leveling ability of a coating material is strongly dependent on its ability to flow, and is influenced by properties such as surface tension, application parameters, drying/evaporation conditions and rates, etc. For instance, if the coating material has insufficient flow, surface defects such as pronounced texture, voids, craters, pitting, Bénard cells, etc., may occur as solvents evaporate from the applied compositions during formation of a solid dry coating. On the other hand, coatings with sufficient flow produce smooth coatings with desired characteristics.

Typically, a base coat layer is applied first. In some embodiments, a light bonding base coat layer may be applied prior to application of the base coat layer. The bonding base coat layer comprises a rubberized resin base and various solvents (and in some embodiments, one or more additives), and is typically applied in one or two thin coats to a previously uncoated surface (e.g., no prior application of a base coat layer) in order to minimize paint runs from applying one or more base coat layers.

Base coat layers may be clear or mixed with pigments, e.g., fluorescent tint pigments, coloring agents, etc., to result in various custom-made or pre-made colors. The base coat layer comprises a rubberized resin base and various solvents (and in some embodiments, one or more additives), which are blended together to form a homogenous sprayable liquid composition that may be applied to a surface using HVLP spray equipment to achieve a fine finish, minimize defects introduced during the coating process, e.g., from drips and running, as well as increase base coat layer strength, elasticity, and durability.

Optionally, in some embodiments, a clear coat layer can be applied on top of a base coat layer having color to increase shine and finish. Optionally, in other embodiments, a gloss or semi-gloss layer can be applied on top of the base coat layer or clear coat layer. These embodiments are described in detail herein.

It should also be noted that sprayable liquid solvent-based compositions, as disclosed herein, are specifically formulated for HVLP spraying. Other approaches, such as universal rolling, brushing and spray, may not achieve a uniform coating and may also be subject to contamination.

Composition of Base Coat Layer

The present invention encompasses sprayable liquid solvent-based compositions for the formation of a protective coating on a surface, the compositions comprising: a resin base (to which a UV stabilizer and absorber is added), one or more solvent(s) to dissolve the resin base, one or more solvents acting as thinning agents, one or more agents acting to increase an evaporation rate of the composition, and optionally, a color additive. The solid protective coating is formed by applying the liquid solvent-based composition to a surface, and allowing the composition to dry/evaporate to form a substantially uniform solid base coat layer.

The compositions of the invention comprise a resin base, which may be plastic, acrylic, and/or epoxy-based resins, etc., with various color tints or clear (and preferably, are UV resistant). The UV stable resin base may be present in an amount of about 4 to 25%, and more preferably 4.75% to 16.25%, with the percentages representing a percent by volume of the total composition.

Resin bases may include one or more of any suitable block copolymer, including styrene, ethylene, butane, butylene, butadiene, isoprene, propylene, etc., in any arrangement and in any combination. Preferred embodiments of the resin base include resins having segments comprising a styrene-ethylene-butene block copolymer, as shown in the FIGURE, e.g., a poly(ethylene-co-1-butene-co-styrene) polymer or similar composition. Molar ratios may be specified at variables "x", "y" and "z" for each block.

Solvents, such as Xylene/Xylol and/or Toluene, to dissolve or solubilize the resin base to form a resin-based solution may be present in an amount of about 20 to 90%, and more preferably 36% to 55%, with the percentages representing a percent by volume of the total composition. Such solvents have relatively low boiling points and may encompass aliphatic C5-C15 hydrocarbons as well as aromatic solvents. Preferably, aromatic solvents are used and may include: benzene, substituted (including halogenated) benzene derivatives, such as toluene/toluol/methylbenzene, xylene/dimethylbenzene/xylol, ethylbenzene, or any other suitable C6-C12 aromatic compound. In preferred embodiments, aromatic solvents comprise toluene, xylene or any combination thereof, wherein xylene or toluene may each be present in an amount ranging from 0 to 100% of the total percent volume of the aromatic solvent.

Solvents used to increase evaporation rates of the solvent-based compositions may include naptha/naphtha, e.g., VM&P Naptha. Such agents are added to improve evaporation rates (accelerate drying times), and may also act as a thinner to reduce runs and drips during application of the solvent-based compositions to a surface. Naphtha may be present in an amount ranging from about 15 to 70%, and more preferably 23-41% by volume.

Embodiments of the present invention include additional solvents, acting as thinning agents. Thinning agents may include a first type of thinning agent, such as any short C2-C24 alkyl chain, or any isomer thereof, and may be present in an amount of about 0 to 16%, and more preferably 2% to 14%, the percentages representing a percent by volume of the total composition. Preferably, thinning agents may be hexane or any isomer of hexane, heptane or any isomer of heptane. Such thinning agents reduce the viscosity of the solvent-based composition to facilitate controlled, even application of the composition onto a surface.

Embodiments of the present invention may encompass a second type of thinning agent, present in an amount from 0 up to 10%, and preferably 0 up to 8%, which include short C2-C24 alkyl chains substituted with one or more carboxyl groups. Preferred embodiments include agents such as methyl ethyl ketone/MEK/butanone/methylpropanone/ethylmethylketone/methylacetone. Such thinning agents reduce the viscosity of the solvent-based compositions, to facilitate controlled, even application onto a surface.

Generally, solvent-based compositions are substantially free from aqueous or water-based components.

Preferred solvent-based compositions, or compositions optimized to produce optimal results, are summarized below in Table 1A. It is noted that specific percentages by volume of each component of the composition may vary at least by plus or minus 5 percent.

TABLE 1A

Preferred Base Coat Compositions

| Liquid Composition | Percentage (%) by Volume |
| --- | --- |
| UV Stable Resin Base | 9.75% to 11.25% |
| Xylene/Xylol and/or Toluene | 41.0% to 49.6% |
| Naphtha | 28.55% to 36.85% |
| Hexane | 6.5% to 8.5% |
| Methyl Ethyl Ketone | 1.75% to 3% |

Table 1A provides ranges of each component of the solvent-based composition, optimized for maximum performance. Increasing the percentages of each component significantly above or below the preferred ranges may yield a sub-optimal or non-functioning composition. For example, increasing xylene above the specified range may result in substantial sagging or running of the solvent-based composition during application as well as lead to adverse chemical reactions. Increasing the percentage of naphtha significantly above the range listed in Table 1A may result in significant cratering and wrinkling of the coating due to an increased evaporation rate. Similarly, increasing the percentage of polymers/resin base significantly above the range listed in Table 1A may cause the coating to develop an undesirable pitted appearance, namely an "orange peel effect", leading to a dry coating that is not smooth, and in more extreme cases, may not be sprayable from a HVLP sprayer.

Additional preferred compositions may further comprise surfactant and fluorinated acrylic polymer agents. Components of the solvent-based compositions may be present in a percent by volume amount of about: resin base 5 to 25%, and more preferably 4 to 16%; UV stabilizer 0 to 10%, and more preferably 0 to 8%; Xylene/Xylol and/or Toluene 20 to 90%, and more preferably 36 to 55%; Naphtha 15 to 70%, and more preferably 23 to 42%; Hexane or N-Heptane 0 to 16%, and more preferably 2 to 14%; Methyl Ethyl Ketone 0 to 10%, and more preferably 0 to 8%; Surfactant 0 to 10%, and more preferably 0 to 8%; Fluorinated Acrylic Polymer 0 to 10%, and more preferably, 0 to 8%; and ceramic microspheres 0 to 20%, and more preferably 0-13%. Table 1B lists still further examples of preferred embodiments. It is noted that specific percentages by volume of each component of the composition may vary at least by plus or minus 5 percent.

TABLE 1B

Preferred Base Coat Compositions

| Liquid Composition | Percentage (%) by Volume |
| --- | --- |
| Resin Base | 9.75%-11.25% |
| UV Stabilizer and Absorber | 0-5% |
| Xylene and/or Xylol/Toluene | 41-49.6% |
| Naphtha | 28.55-36.85% |
| Hexane (or N-Heptane) | 6.5-8.5% |
| Methyl Ethyl Ketone | 1.75-3% |
| Surfactant | .01%-3% |
| Fluorinated Acrylic Polymer | .01-3% |
| Ceramic Microspheres (Optional) | 0-8% |

In some embodiments, surfactants may be added to the compositions disclosed herein in order to lower the surface tension between liquids or between liquids and solids. Surfactants may act as detergents, wetting agents, emulsifiers, foaming agents, and dispersants. Surfactants, which may include, e.g., Worlée-add311, -add315, -add317 and -add356, etc., show major performance enhancing effects such as improved glossiness, reduced leveling, improvement of mar-resistance as well as reducing surface defects. Generally, surfactants are added in an amount of 0.02% to 0.1% on an active ingredient basis, and for solvent-based compositions, typically 0.05%.

Fluorinated acrylic polymers, e.g., Dupont Capstone F-83, etc., in small volumes may optionally be added to the compositions disclosed herein. Fluorinated acrylic polymers may lower surface tension in the compositions disclosed herein, and are compatible with a wide range of organic solvents. Decreasing surface tension enables better wetting, spreading and self-leveling. Additionally, upon curing, fluorinated acrylic polymers repel water and oil, as well as provide resistance from corrosion and other chemical reactions which may act to degrade the coating. Typical use rates of fluorinated acrylic polymers range from 0.02% to 0.1% on an active ingredient basis, and preferably, 0.05% for solvent-based compositions.

Ceramic microspheres may optionally be added into the composition, up to 15% by weight for the solid microspheres, acting as a protective top layer to reduce marring and scratching of the solid coating to which it has been incorporated. Additionally, microspheres enhance performance by increasing gloss control, burnish resistance, hardness, corrosion resistance, abrasion resistance, and in some embodiments, may allow reduced amounts of Volatile Organic Compounds (VOCs) to be used in solvent-based compositions. Generally, microspheres are solid particles, e.g., glass, polymer, ceramic, etc., and are roughly 3 to 10 microns in diameter, although particles of a smaller diameter, e.g., nanospheres may be used (interchangeably with microspheres) as well. Microspheres may be added to both base coat liquid compositions as well as top coat liquid compositions. As the composition dries, microspheres become enriched near the top surface of the solid coating, and form a protective layer within the solid coating.

Optionally, a thickener (not shown in Table 1B), e.g., a thixotropic thickener, may be added to the solvent-based compositions (e.g., base coat or top coat) disclosed herein. Thickeners may modify the rheology of the suspension (which comprise a solvent-based formulation and micro- or nanospheres), allowing the micro- or nanospheres to remain suspended and/or enriched near the top surface of the coating, and thus, prevent "settling out" of the micro- or nanospheres, to increase coating performance.

Thickeners may form thixotropic colloidal gels in aqueous and organic solutions, offering rapid dispersibility, effective thixotropic thickening as well as providing sag resistance and viscosity control, while providing desirable leveling properties. Thixotropic agents form a gel at rest, yet become thin under application of shear forces or agitation. Upon removal of such forces, viscosity increases gradually as the particles of the gel slow, eventually coming to rest. In some embodiments, thickeners such as Attagel® may be used with the solvent-based compositions disclosed herein.

In other embodiments, ethyl vinyl acetate (EVA) may be optionally added to the solvent-based compositions disclosed herein. EVA generally has excellent flexibility, great color pigment dispersion properties and plasticizer resistance, and provides high gloss along with good gloss retention. Additionally, EVA is resistant to color changes such as yellowing, and is suitable for use with (can bind with) metallic pigments used for coloring. EVA also has excellent hardness, very good durability and low or minimal odor.

In other preferred embodiments, solvent-based compositions may include low VOCs compositions as shown in Table 1C, in order to comply with state and/or federal emission standards and reduce environmental impact. Due to local, federal and international policies, low VOC solvent-based compositions may be preferred. Low VOC formulations replace or reduce the amount of VOC solvents, e.g., napthene, xylene and toluene etc., with other solvents having higher boiling points.

In other embodiments, preferred compositions of low VOC compositions include: components of the solvent-based composition present in a percent by volume amount of about: resin base 5 to 30%, and more preferably 4 to 19%; UV stabilizer 0 to 10%, and more preferably 0 to 8%; Xylene/Xylol and/or Toluene 0 to 30%, and more preferably 0 to 20%; Naphtha 0 to 40%, and more preferably 5 to 25%; Hexane or N-Heptane 0 to 20%, and more preferably 2 to 13%, Methyl Ethyl Ketone, 0 to 10%, and more preferably 0 to 8%; Surfactant 0 to 10%, and more preferably 0 to 8%; Fluorinated Acrylic Polymer 0 to 10%, and more preferably 0 to 8%; acetone 15 to 80%, and more preferably 27 to 45%; p-chlorobenzotrifluoride 0 to 35%, and more preferably 0 to 30% (or even more preferably 11.9-14.38%); and ceramic microspheres 0-20%, and more preferably 0-13%. Table 1C lists still further examples of preferred embodiments. It is noted that specific percentages by volume of each component of the composition may vary at least by plus or minus 5 percent.

TABLE 1C

Preferred Base Coat Low VOC Compositions

| Liquid Composition | Percentage (%) by Volume |
| --- | --- |
| Resin Base | 9.75-14.25% |
| UV Stabilizer & Absorber | 0-5% |
| Toluene | 0-15% |
| Naphtha | 10.55-18.9% |
| Hexane or N-Heptane | 6.5-8.5% |
| Methyl Ethyl Ketone | 1.75-3% |
| Surfactant | .01-3% |
| Fluorinated Acrylic Polymer | .01-3% |
| Acetone | 32.4-39.18% |
| p-chlorobenzotrifluoride | 0-30% |
| Ceramic Microsphere (Optional) | 0-8% |

Acetone and p-chlorobenzotrifluoride have higher boiling points than VOC compounds, while acting as a solubilizer and thinner.

Optionally, an adhesion promoter may be used to increase adhesion between the base coat and the surface to which it is applied. Using the adhesion promoter on raw plastics makes the coating very durable and difficult to remove. Adhesion promoters may also be used on urethane plastics, e.g., such as around a car door handle or a powder coated wheel.

Base Coat Layer with Color

In still other embodiments, a color additive or tint may be added to the solvent-based compositions disclosed herein to change the appearance of a surface to which the composition is applied. For example, color additives may include a fluorescent tint pigment. Fluorescent tint pigments may be mixed in with the base coat to achieve a base coat layer with color. Fluorescent tint pigments have superior tinctorial strength, exceptional brightness, and excellent heat stability with stronger solvent and bleeding resistance as compared to other commercially available fluorescent pigments, including thermoset fluorescent pigments. Fluorescent tint pigments, e.g., non-polar gravure inks, PVC plastisols, paper coatings, PVC screen inks, crayons, etc., are generally easy to apply as such pigments may be dissolved in a variety of organic solvents having non-polar and weak polar bonds (e.g., aromatic hydrocarbons, acetate esters, fatty alcohols, etc.).

Some universal tints and toners have difficulty dispersing into the solvent-based compositions disclosed herein, showing a chalking effect, loss of gloss, and poor color dispersion. In some cases, wet beads of ink may appear on the surface of the coating during evaporation/drying of the applied composition. In some embodiments, additional mixing is required to disperse the ink. Preferably, industrial tints such as PPG 4257, a solvent-based industrial tint manufactured by Pittsburgh Paints, are used with the compositions disclosed herein. In other embodiments, additives, e.g., 2-methylethyl-1-acetate, are added to increase dispersion of tints or acrylic resins and increase product performance. Tints may be added to the compositions disclosed herein at less than 8 oz. of tint per gallon of solvent-based composition.

In other embodiments, industrial tints, preferably with a low VOC content for use in solvent-based compositions, may be used with the low VOC solvent-based formulations disclosed herein.

Various toners, pigments, and colorants are commercially available to modify and manipulate color, e.g., alkyd resin based systems, plastic particulate pearls, tints in liquid form, pearl in powder form, urethane pearls and other additives, etc., may be mixed with the liquid solvent-based compositions to allow for virtually any known color combination. Additionally, UV glow, fluorescent and temperature changing colorants may be used that are compatible with the compositions disclosed herein.

Table 2 shows various physical properties of Fluorescent Tint pigments.

TABLE 2

Physical Properties & Chemical Nature of Fluorescent Tint

| Product Forms | |
| --- | --- |
| Solid Dye Solution in a Thermoset Resin | |
| Specific Gravity (Density): | 1.34 g/cm$^3$ |
| Average Particle Size: | 3.0-5.0 μm |
| Decomposition Point: | 225° C. |
| Oil Absorption: | 550g/100 g pigment |

Certain metal ions may cause color changes and loss of brightness with fluorescent pigments. In some cases, plastic processing additives containing "free" zinc, magnesium, calcium and iron may cause deleterious color effects when used in a plastic resin system containing fluorescent pigments. If a metal containing additive is used, it should be thoroughly tested to ensure that it does not interfere with the color stability of the fluorescent pigment. Metallic compound flakes and visual metallics may also induce rust and corrosion and are generally not incorporated with the present compositions.

The fluorescent pigments disclosed herein are essentially non-toxic and do not contain any constituent heavy metals and, therefore, are deemed safe to be applied in a finished product, e.g., graphic art, color base coat, etc.

The solvent-based compositions disclosed herein should be stored, handled and used in accordance with good industrial hygiene practices and in conformity with all applicable legal regulations.

Characteristics of Base Coat Layer

The appearance of the sprayable solvent-based composition is also described herein. In clear liquid form, the solvent-based composition is tacky with a slight yellowing in color. If tinted, the solvent-based composition is of the tinted color. Compositions with color have excellent color retention and, therefore, when the solvent-based composition dries, the solid form of the composition will retain the desired color.

As mentioned previously, once the solvent-based composition dries to form a solid coating, the rubberized coating has both elastic and adhesive properties. Although the rubberized coating has good adhesion to the surface to which it is applied, it may be mechanically peeled by hand from the surface. The rubberized coating maintains stability under normal atmospheric temperatures and up to 150° F. for extended periods of time. Additionally, the rubberized coating may be mechanically removed in substantially one piece after application, e.g. more than 6 months, due to its stability.

The liquid form of the solvent-based composition should be sealed, free from air exposure, and stored at room temperature. Regarding toxicity, the solvent-based composition is flammable, toxic when inhaled, and irritates the skin. Proper protection is required when applying the solvent-based composition in its liquid form.

Compositions of Top Coat Layer

In some embodiments, an optional top coat or gloss coat layer may be applied on top of the base coat layer. Preferred compositions of the top coat layer are described below in conjunction with Table 3. In some embodiments, solvents (not shown) may be included in the compositions of Table 3.

TABLE 3

Preferred Composition of the Top Coat Layer

| Top Coat (Optional) | Percentage (%) by Volume |
| --- | --- |
| Elastic Silicone Resin | 5-10% |
| UV Stabilizer | 0-3% |
| Hexane or N-Heptane | 0-8% |
| Butanone | 1.75-3% |
| Surfactant | 0-3% |
| Microspheres/Nanospheres | 0-8% |
| Hardener or low VOC hardener | (see below) |

The hardener may include any commercially available hardener. Preferred compositions of a top coat hardener include, but are not limited to, a hardener comprising isocyanates, butyl acetate, xylene, ethylbenzene and naphtha. Preferred compositions of a low VOC top coat hardener include, but are not limited to a hardener comprising isocyanates, butyl acetate, xylene, ethylbenzene, acetone and p-chlorobenzotrifluoride.

A material hardener may be added at time of application to increase gloss appearance and improve surface appearance. Without the hardener, the coating may remain sticky to the touch and hold dirt and debris. Adding excessive hardener will result in surface separation and longer drying times. In general, less than an 8:1 ratio of top coat composition to hardener chemical composition should be used in order to attain optimal results.

Applying the top coat improves product performance by increasing chemical and marring resistance, providing additional UV reflection, and improving appearance. By applying the top coat layer onto the base coat layer, the material remains removable in substantially one piece. In contrast, solid urethane clear coats were tested as top coats and demonstrated flaking and cracking upon removal and/or impact. Such urethane coats were difficult to remove and separated into multiple components during removal.

In other embodiments, a top coat or gloss coat composition is described as shown in Table 4 below.

TABLE 4

Gloss Coat Composition

| Gloss coat (Optional) | Percentage (%) by Volume |
| --- | --- |
| liquid or Solid Acrylic Resin (See Below) | 5% to 10% |
| Xylene/Xylol AND/OR | 45% to 95% |
| VM&P Naphtha | 45% to 95% |

At least two combinations are available, one that provides a clear semi gloss finish and another that provides a gloss finish. Gloss coats generally comprise a liquid or solid acrylic resin. Desired characteristics of acrylic resins include excellent color or clarity, good gloss retention, and weather resistance. Such resins should also have excellent resistance to soap and detergent. Gloss coats may be used for automotive finishes.

In other embodiments, additives such as 3M PM-4800, Dupont F22 or F82, may be added to the compositions disclosed herein. Such additives may be used to increase chemical resistance, in order to prevent or reduce damage to the solid base coat from exposure to gasoline or motor oil as well as other chemical spills. Under increasing loads, some additives may exhibit greatly reduced adhesion levels, which may increase if the material is exposed or submerged in water.

Advantages

Solvent-based compositions disclosed herein form solid coatings which are resistant to small abrasions and impact. Additionally, incorporating ceramic microspheres or nanospheres into the solvent-based compositions provides an additional level of protection, as the ceramic microspheres or nanospheres may also absorb impact from debris coming into contact with the solid coating. Further, ceramic microspheres are resilient, allowing abrasive objects to slide across the surface of the solid coating, thereby protecting the surface from deformation or scratches. Under larger forces, the elastic base coat may separate from the surface to which it was applied in order to protect the underlying surface.

Additionally, base coat layers as disclosed herein, after being installed, can be repaired and rejuvenated. For instance, coatings can be wet- or dry-sanded (or polished) to remove minor surface defects, e.g., stains, light/mild scratches, etc., as well as defects occurring during application, e.g., paint runs, etc. Substantial defects, e.g., heavy scratches, tearing or ripping of the base coat, etc., may be patched/rejoined by cleaning the affected area and using a solvent to melt/dissolve the partially or fully detached base coat with the undamaged base coat.

Base coatings are suitable for long-term use, projected to last for two years or more after application under normal outdoor conditions. Additionally, the solvent-based compositions disclosed herein dry efficiently, with a typical drying time of less than 30 minutes in 55° F. weather.

Additionally, the base coat layer may be easily removed by mechanical peeling, e.g., peeling by hand. This may be achieved by dislodging a section of the coating and applying enough force or pressure to separate the material from the surface to which it was applied. Usually, the solid base coats disclosed herein are removed from the surface as substantially one piece. Small amounts of residue left behind from removal of the base coat may be removed with automotive industrial wax or grease and silicone remover.

Methods of Application

Examples are provided herein of various methods of applying solvent-based compositions. It is not intended that the present invention be limited to these specific examples.

EXAMPLES

Example 1

Method for General Application

The general methods as described in this example apply broadly to the methods of application of the solvent-based compositions disclosed herein.

The solvent-based compositions disclosed herein may be blended together to form a homogenous solution, using any suitable industrial mixer in an appropriate container.

The solvent-based compositions may be applied with a HVLP spray device and/or a Reduced Pressure (RP) apparatus, allowing compositions to conform to modern environmental regulations for air quality control. The spray device typically has a tip size ranging from 0.9 to 2.2 mm, and preferably a tip size of about 0.059 inches (1.5 mm), with an approximate flow rate of 12-16 oz./min (0.36 to 0.53 liters/min). Tip size may vary according to the individual spray painter's preference. In some embodiments, the spray device has a heating component, which heats the composition as it is applied to lower the viscosity of the paint. In some embodiments, heating the air supply of the spraying device or of the surface to be coated to 80-110° F., may improve drying velocity and leveling results, to produce a faster drying and finer, more even finish. The spray device also maintains a constant regulated air pressure.

The following general method of application applies to all layers, including the base coat layer and top coat layer.

Preparation

The surface to be coated is inspected for debris, damage or contaminants. If needed, the surface is cleaned with a prepping agent such as a water-based cleanser using a soft cloth or soft scratch proof towel. In some cases, a blend of acetone, xylene and methyl isobutyl ketone may be used for cleaning, to remove oils, grease, silica and contaminants that may adversely affect proper adhesion of the sprayable solvent-based coating to the surface to which it is being applied. In other cases, an alcohol-based solution may be used to prepare the surface, although alcohol based compositions may require more physical effort to release oils and silica from the surface.

The solvent-based compositions may be applied to a variety of surfaces including metals, plastics, chrome, urethane, polyurethane, and UV cured powder coatings. In general, surfaces to be coated are checked for possible adverse reactions with solvents, e.g., xylol or xylene, prior to being coated.

The spray device is cleaned from any past mixtures and or other contaminants prior to use. Prior to application, the solvent-based composition is stirred using a rotational method, avoiding the introduction of bubbles into the liquid composition. Using a thin straining device, the solvent-based composition is poured into the spray device and into a holding container, e.g., a gallon container, etc., attached to the spraying device.

A mask may be applied to the surface to protect regions that are not to be sprayed as well as protect other regions from overspray. Masking compositions, e.g., tape, etc., that do not leave behind an adhesive residue or damage the surface upon removal are preferred. Additionally, masks should be easy to remove. Masks may also be used for creating various patterns, stripes and graphics onto a surface. By masking off the area and spraying desired patterns, the artist can make various removable designs and patterns in a reduced amount of time.

Base Coat

A first light bonding base coat may be applied evenly to the surface. While optional, it is highly preferred to apply a light bonding base coat with no color added. The solvent-based composition is allowed to dry, forming a satin finish. After the first coat dries, a second coat may be applied evenly to the surface. Care should be taken so as not to cause runs or create accidental drips of the material during the spray application. Runs, drips or other defects may be repaired using the repair process described below.

Once the light bonding base coat(s) have completed drying, base coat layers may be applied. Base coat layers typically comprise at least five applications of the solvent-based compositions, by repeatedly applying a coating to the surface and allowing the coating to dry.

Total thickness for a wet coat may be between 5-6 mils. For a dry coat, thickness may range from 2 to 3 mils. Even though full coverage (including color coverage) can be achieved with thinner coatings, it is preferred to form coatings in the recommended range of thickness, so that the coating is able to withstand forces from mechanically peeling the coating during removal, without excessive tearing. For instance, dry coatings with a thickness of less than 2 mils result in weak product strength, and tear easily during removal.

Solvent-based compositions are applied in even coats, with the spray painter applying as much material as desired in a single coating step, without causing the material to streak, run or puddle, in order to save time and material. Although the solvent-based composition is designed to reduce defects from runs and drips, this may still occur if excessive amounts of the composition are applied in a single coating step.

If a color base coat is being applied, and the color of the surface area is different from the coating material color, additional coats are applied until the surface color (being covered by the composition) is no longer visible and/or the desired result is achieved. Full color coverage is typically achieved in less than 3 coats, and should be completed before applying a clear base coat, that is, a base coat formulation without color added. Color coats, upon drying, form a matte finish. While optional, it is preferred that a clear base coat, preferably at least two coats, is evenly applied over a color coat. Additionally, a top coat layer may be applied on top of the clear base coat or color base coat to achieve different types of finishes.

Between applying coats, runs, drips or other defects may be repaired using 400-2000 grit wet sandpaper to smooth out affected regions.

Top Coat (Gloss Coat)

If a top coat (gloss coat) is desired, at least four coats should be applied over the base coat or color base coat, with each layer being allowed to dry between coatings. For best results, it is preferred that a subsequent coat is applied no longer than 12 hours after any prior coat, including the base coat. If subsequent coats are to be applied at a later point in time, wet sanding the previously sprayed surface area with 1500-2000 grit wet sandpaper is preferred.

Finishing

Once all desired coatings have been applied, masking materials may be removed. Masking regions that are difficult to remove may be scored with a sharp blade to assist in removing material from the masked surface. Masks may be removed by mechanical peeling forces applied by hand.

Edges of the applied material that have detached from the surface area may be reattached with any compatible solvent, e.g., xylene, toluene, etc., and an appropriate artisan brush. Xylene or toluene can be used to remove any overspray from surfaces that were not intended to be coated.

Graffiti, artwork, or airbrushing may be applied on one or more base coats of material. This leads to removable artwork, as the artwork may be removed by simply mechanically peeling the underlying base coat, which is underneath the applied graffiti, artwork, and/or airbrushing. Additionally, a clear base coat may be applied on top of the artwork to improve UV resistance, improve gloss, as well as provide a layer of protection to the applied art.

When solvent-based compositions are applied to a surface in the form of lettering, e.g., for use on a commercial vehicle, the lettering may be removed in one entire sheet, if applied on top of a base coat (as opposed to removing individual letters). Such techniques also prevent ghosting, an effect that occurs when a sticker or film is left on a surface for an extended period of time, and the surrounding area is affected by UV damage/discoloration.

Cleaning and maintenance of the rubberized resin coating may include a soap and water wash. Soaps and cleaners that contain hydrophobic ingredients increase product performance. The rubberized resin coating is able to withstand 2500 PSI of water pressure.

Other embodiments encompass preparing a car for a non-removable coat. In such scenarios, the surface to be coated is scuffed with an abrasive pad. The solvent-based compositions may be applied in the same manner as previously described.

Example 2

Single-Stage (Base Coat) Application

A first coat, or light bonding base coat, should be applied on all edges of each surface in a round spray pattern, with the sprayer positioned about 4 to 12 inches from the surface. Regions that will see the most wear and tear are coated, to provide added bond to these areas. Then, the entire body is coated using a wide spray pattern, providing a relatively thin coating over the entire surface to provide a solid foundation for the coating process. It is preferred to use a clear base coat, as the first coat, since the first coat is more likely to run on a previously untreated surface. Minor runs are fine, but physical build up of runs should not be present. Additionally, application of the first coat should not appear wet. The first coat dries in approximately 15 minutes, depending on ambient temperature and the temperature of the coated surface.

Additional coats, up through the final layer of the base coat, should be applied as evenly and, as applicable, as color rich as possible without runs or puddles. Layers may be added until desired results are achieved, with five to nine coats of the composition typically needed for a complete, durable coating. It is noted that excessive layers of compositions may result in a rough appearance after about twelve or more coats. If color is not desired, the solvent-based composition may be applied as a clear base coat, using untinted compositions.

Example 3

Two-Stage (Base Coat Layer/Clear Base Coat Layer) Application

For the first stage, the single stage application procedure described above may be followed. Briefly, a base coat layer, which may also include a light bonding base coat, is formed from at least two applications or coats of the base coat. All other procedures described above apply. Optionally, sandpaper, e.g., a 1500 to 2000 grit sandpaper, may be used to sand each layer of the base coat (once dry) for a smoother final finish. Compositions for a base coat, including color, are applied.

For the second stage, a clear base coat layer may be formed from a minimum of four applications (coats) in order to maintain proper UV protection. The sprayer should be cleaned thoroughly, when switching from the color base coat layer to the clear base coat layer. Additionally, present invention embodiments may encompass addition of any metallic agent into the solvent-based composition for the base coat.

A top coat, e.g., gloss or semigloss, may optionally be applied on top of a base coat or clear base coat to provide additional protection against rocks, salt or abrasion. For example, a front of a vehicle may be coated with a clear base coat and a gloss topcoat to produce a removable protective barrier on a surface of an auto.

Example 4

Three-Stage Application (Fluorescent, Candy and Pearl Layer)

The first two stages of the three-stage application, as previously presented, which describe a basecoat and a top coat, apply. However, in three stage application, fluorescent, candy and/or pearl coat paints are sprayed evenly, between applications of the base coat and clear base coats, until desired results are met. Thus, in an example embodiment, a base coat layer may be applied first, followed by a fluorescent, candy and/or pearl coat layer, and followed by a clear base coat layer.

Example 5

Characterization of Base Coat Layer

The specific compositions disclosed herein include a resin base, along with various solvents and additives. A sample of the base coat layer was analyzed by Nuclear Magnetic Resonance (NMR) and Gel Permeation Chromatography (GPC).

For NMR analysis, the sample was dried overnight at room temperature under a flow of nitrogen gas to remove the solvents. The sample was dissolved in chloroform-d with chromium acetylacetonate added as a relaxation agent. NMR experiments were performed at ambient temperature employing the Bruker Avance III 500 FT-NMR spectrometer equipped with a 10 mm BBO probe. Quantitative $C^{13}$ NMR data was acquired using inverse-gated decoupling, a 30° pulse, and a 6 second relaxation delay. $^1H$ NMR data was acquired using a 30° pulse and a 1 second relaxation delay. The chemical shift scales were referenced to the solvent peak. An initial analysis of the sample showed that the solvents interfered significantly in the identification of the base coat composition. Therefore, the solution was dried to remove as much of the solvents as possible prior to the final analysis. Drying was carried out without heat to avoid any possibility of crosslinking, which might render the base coating insoluble. Typical experimental uncertainties for spectra with similar signal/noise were estimated at about ±0.05. It was noted that residual solvent may introduce further uncertainty, and in particular, result in a higher reported ethylene value.

For GPC analysis, approximately 2 g of sample base coat was transferred into a glass vial and placed under a nitrogen gas stream to evaporate off volatile components. A solid material was left behind. The solid material was used to prepare a sample prep at a concentration ~0.6% (w/v) using the mobile phase as the diluent. The sample preparation was placed on a wrist action shaker for 30 minutes. Upon visual inspection, the sample preparation contained undissolved particulates. The sample preparation was filtered through a 0.45 µm filter prior to injection. The operating conditions used to analyze the sample are shown below in Table 5.

TABLE 5

Operating Conditions for GPC

| Parameters | Conditions |
|---|---|
| Column Set | (2) 300 × 7.5 mm PLgel Resipore |
| Column Temperature | 35° C. |
| Mobile Phase | Xylene |
| Flow Rate | 1.0 mL/min |
| Injection Volume | 50 µL |
| Detection | Refractive Index |
| Detector Temperature | 35° C. |
| Run Time | 35 minutes |

A solubility test was done to determine a suitable solvent to dissolve the dried material. None of the solvents dissolved the solid material completely, but xylene appeared to dissolve the solid material reasonably well. To determine the molecular weight and the MWD, the instrument was calibrated using narrow polystyrene (PS) standards ranging from 162-508 kDaltons. The results were relative to PS and not absolute, which means that it is possible that the results could differ significantly from the absolute values.

Results

Based on NMR and GPC results, the base coat composition was determined to be a blend of components with different molecular weights and distributions with the following properties. Table 6 shows the relative amounts of the monomers, for the block copolymer structure shown in the FIGURE. It is to be understood that present invention embodiments are not limited to these specific molar ratios.

TABLE 6

Monomer Ratio (NMR Data) for Base Coat Coating

| Monomer | Molar Ratio |
|---|---|
| Styrene (x) | 1.00 |
| Ethylene (y) | 1.24 |
| Butene (z) | 0.38 |

Table 7 shows molecular weight distribution data based on the GPC analysis. Peak 1 and Peak 3 have relatively narrow distributions and Peak 2 has a relatively broad distribution (Peaks are not shown). The results shown in Table 7 are an average of two replicate injections and are relative to polystyrene. The mass represented by Peak 3 is likely to be residual solvents, while Peaks 1 and 2 are likely to be components of the resin base coat.

TABLE 7

Molecular Weight Distribution Data (GPC DATA)

| Sample ID | Mn (Daltons) | Mw (Daltons) | Mp (Daltons) | Mz (Daltons) | PDI (Mw/Mn) |
|---|---|---|---|---|---|
| PC1.5 (peak 1) | 77,100 | 80,900 | 76,800 | 86,500 | 1.0 |
| PC1.5 (peak 2) | 2,220 | 5,130 | 4,090 | 9,990 | 2.3 |
| PC1.5 (peak 3) | 220 | 220 | 220 | 220 | 1.0 |

Example 6

Extended Stability of Base Coat

A base coat (or a base coat and a top coat) was applied based on the procedures described herein. Exceptional stability of the base coat was demonstrated after application of the base coat. Good retention of elastic and adhesive properties was demonstrated as the base coat was able to be easily removed in substantially one piece more than six months after application. The base coat did not adhere excessively to the surface to which it was applied, resulting in ease of mechanical peeling of the base coat from the surface.

Having described preferred embodiments of new and improved removable spray coatings and application methods, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed is:

1. A first homogeneous sprayable liquid solvent-based composition formulated for spraying onto an exterior surface of an automotive vehicle to protectively cover said surface, wherein the sprayable liquid composition, once dry, forms a removable protective first coating on said exterior surface, the sprayable liquid solvent-based composition comprising:
   (a) a rubberized resin base comprising a poly(ethylene-co-1-butene-co-styrene) block copolymer;
   (b) an aromatic solvent to solubilize the resin base;
   (c) a first thinning agent to reduce viscosity of the first composition; and
   (d) an agent to increase an evaporation rate of the first composition,
   wherein the removable protective first coating, once dry, forms a solid, rubberized and uniform peelable coating which is adhered to said exterior surface without use of a separate adhesive coating layer.

2. The composition of claim 1, wherein the resin base is present in an amount of about 5% to 30%, the percentages representing a percent by volume of the total composition.

3. The composition of claim 1, wherein the aromatic solvent comprises one or more from the group consisting of:
   (a) xylene;
   (b) xylol; and
   (c) toluene.

4. The composition of claim 1, further comprising a surfactant.

5. The composition of claim 1, wherein the first thinning agent is hexane.

6. The composition of claim 1, further comprising a second thinning agent, wherein the second thinning agent is methyl ethyl ketone.

7. The composition of claim 1, further comprising a UV stabilizer and absorber.

8. The composition of claim 1, further comprising acetone and p-chlorobenzotrifluoride.

9. The composition of claim 1, further comprising a fluorinated acrylic polymer.

10. The composition of claim 1, further comprising nanospheres or microspheres.

11. The composition of claim 1, further comprising a second sprayable solvent-based composition for the formation of a removable protective second coating applied on top of the removable protective first coating, the second sprayable solvent-based composition comprising:
(a) an elastic silicone resin;
(b) a UV stabilizer;
(c) hexane or N-heptane;
(d) butanone;
(e) a surfactant;
(f) microspheres or nanospheres; and
(g) a hardener,
wherein the removable protective second coating formed by drying the second sprayable solvent-based composition on top of the removable protective first coating forms a uniform layer.

12. An article of manufacture, comprising an exterior surface of an automotive vehicle coated with the removable first coating of claim 1.

13. The composition of claim 1, wherein the removable protective first coating is removable by mechanical peeling over a temperature range of at least 32° F. to 70° F.

14. A method of protecting an exterior surface of an automotive vehicle, said method comprising:
applying the sprayable liquid solvent-based composition of claim 1 for the formation of a removable protective coating on said exterior surface.

15. The method of claim 14, wherein the resin base is present in an amount of about 5% to 30%, the percentages representing a percent by volume of the total composition.

16. The method of claim 14, wherein the aromatic solvent comprises one or more from the group consisting of:
(a) xylene;
(b) xylol; and
(c) toluene.

17. The method of claim 14, wherein the composition further comprises a UV stabilizer and absorber.

18. The method of claim 14, wherein the composition further comprises acetone and p-chlorobenzotrifluoride.

19. The method of claim 14, wherein the composition further comprises nanosphere or microspheres.

20. The composition of claim 1, wherein the evaporation increasing agent is naphtha.

21. The composition of claim 1, wherein the removable protective first coating is mechanically peeled by hand.

22. The composition of claim 1, wherein the removable protective first coating has a dry coating thickness from 2 to 3 mils to withstand peeling forces without tearing.

\* \* \* \* \*